United States Patent
Gerbing et al.

(10) Patent No.: US 8,790,772 B2
(45) Date of Patent: Jul. 29, 2014

(54) IMPREGNATING METHOD FOR THE PRODUCTION OF WOUND COUPLING COATINGS

(75) Inventors: Tim-Florian Gerbing, Betzdorf (DE); Christian Spandern, Elkenroth (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 774 days.

(21) Appl. No.: 12/647,314

(22) Filed: Dec. 24, 2009

(65) Prior Publication Data

US 2010/0096238 A1     Apr. 22, 2010

Related U.S. Application Data

(63) Continuation of application No. PCT/DE2008/001031, filed on Jun. 16, 2008.

(30) Foreign Application Priority Data

Jun. 28, 2007   (DE) .......................... 10 2007 029 932

(51) Int. Cl.
B32B 25/02     (2006.01)
B29C 53/80     (2006.01)
C08J 5/14      (2006.01)

(52) U.S. Cl.
USPC ....... 428/295.1; 428/66.2; 428/375; 428/378; 428/372; 428/396; 156/149; 156/148; 156/162; 156/169; 156/172; 192/107 M; 188/251 R; 427/386; 106/36; 523/149; 523/156; 523/157; 523/158

(58) Field of Classification Search
None
See application file for complete search history.

(56) References Cited

U.S. PATENT DOCUMENTS

| | | | | |
|---|---|---|---|---|
| 2,138,876 A * | 12/1938 | Novak | ........................... | 28/169 |
| 2,221,400 A * | 11/1940 | Geyer | ...................... | 192/107 R |
| 2,379,166 A * | 6/1945 | Lucid | ............................ | 264/122 |
| 3,290,423 A * | 12/1966 | Hatch et al. | .................. | 264/294 |
| 3,305,519 A * | 2/1967 | Twiss et al. | ................... | 523/157 |
| 3,437,546 A * | 4/1969 | Lombardy | ..................... | 428/37 |
| 3,520,390 A * | 7/1970 | Bentz | ........................ | 192/107 R |
| 3,526,306 A * | 9/1970 | Bentz et al. | ............. | 192/107 M |
| 3,627,606 A * | 12/1971 | Bentz et al. | ................... | 156/184 |
| 3,655,609 A * | 4/1972 | Evans et al. | ....................... | 524/4 |
| 3,725,334 A * | 4/1973 | Popp et al. | .................... | 523/157 |
| 4,320,823 A | 3/1982 | Covaleski | | |
| 4,349,595 A | 9/1982 | Trainor et al. | | |
| 4,364,997 A * | 12/1982 | Yamamoto et al. | ........... | 428/372 |
| 4,411,851 A * | 10/1983 | Sakabe et al. | ................ | 264/137 |
| 4,785,040 A * | 11/1988 | Gupta et al. | .................. | 524/445 |
| 5,091,036 A * | 2/1992 | Taylor | ........................ | 156/379.6 |
| 5,098,496 A * | 3/1992 | Breitigam et al. | ............. | 156/180 |

(Continued)

FOREIGN PATENT DOCUMENTS

| | | |
|---|---|---|
| DE | 42 39 441 X | 5/1994 |
| DE | 43 21 938 X | 1/1995 |

(Continued)

OTHER PUBLICATIONS

JP07-011237, Kato, Jan. 1995, machine translation.*

(Continued)

*Primary Examiner* — Jill Gray

(74) *Attorney, Agent, or Firm* — Lucas & Mercanti, LLP

(57) ABSTRACT

A wound friction coating and a method for the production thereof.

14 Claims, 1 Drawing Sheet

(56) References Cited

U.S. PATENT DOCUMENTS

| | | | |
|---|---|---|---|
| 5,156,787 A * | 10/1992 | Booher | 264/135 |
| 5,412,058 A * | 5/1995 | Dreyfus et al. | 528/129 |
| 5,433,774 A * | 7/1995 | Kapl et al. | 106/36 |
| 5,462,620 A * | 10/1995 | Booher | 156/180 |
| 5,495,922 A * | 3/1996 | Booher | 188/251 A |
| 5,503,928 A * | 4/1996 | Cheshire | 428/357 |
| 5,670,231 A * | 9/1997 | Ohya et al. | 428/66.2 |
| 5,736,619 A * | 4/1998 | Kane et al. | 525/393 |
| 5,911,932 A * | 6/1999 | Dyksterhouse | 264/136 |
| 5,952,447 A * | 9/1999 | Ikeda | 528/163 |
| 6,080,230 A * | 6/2000 | Sasaki et al. | 106/36 |
| 6,582,640 B2 * | 6/2003 | Willemse | 264/119 |
| 7,897,232 B2 * | 3/2011 | Gerbing et al. | 428/66.2 |
| 2009/0166144 A1 * | 7/2009 | Gerbing et al. | 192/107 M |

FOREIGN PATENT DOCUMENTS

| | | |
|---|---|---|
| DE | 103 09 809 X | 10/2003 |
| JP | 06016831 A * | 1/1994 |
| JP | 07011237 a * | 1/1995 |
| WO | WO 2007106880 A2 * | 9/2007 |

OTHER PUBLICATIONS

JP06-016831 Hyodo, Jan. 1994, machine translation.*
Viscosity Table 2010.*

* cited by examiner

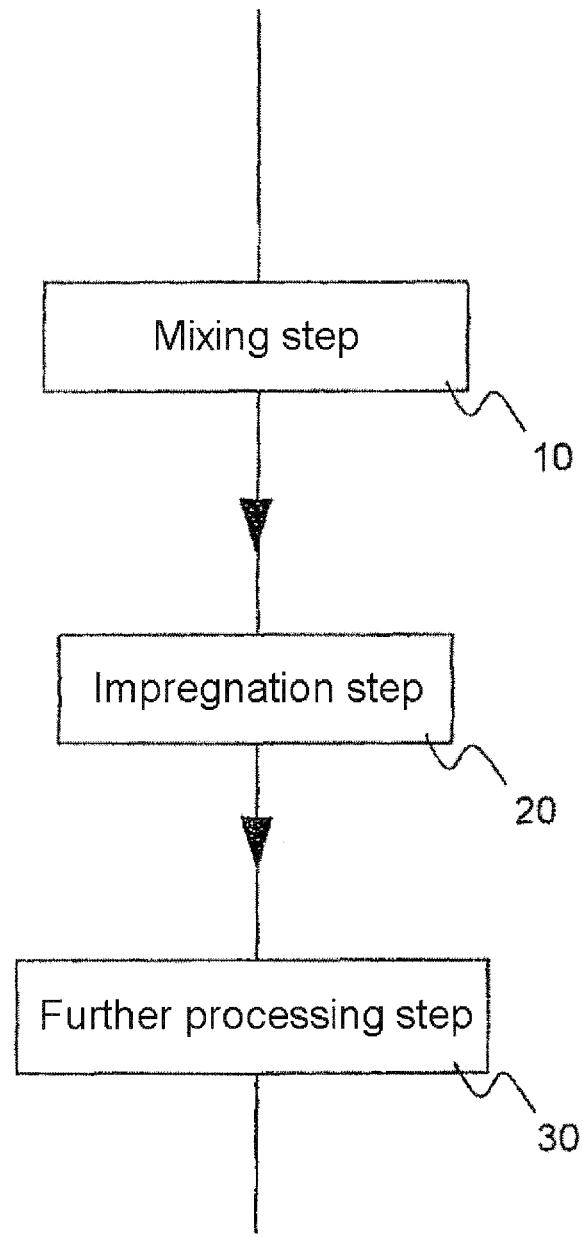

IMPREGNATING METHOD FOR THE PRODUCTION OF WOUND COUPLING COATINGS

This application is a continuation application of PCT/DE2008/001031 filed Jun. 16, 2008, which in turn claims the priority of DE 10 2007 029 932.1, filed Jun. 28, 2007, the priority of these applications is hereby claimed and these applications are incorporated by reference herein.

BACKGROUND OF THE INVENTION

1. Field of the Invention

The invention relates to a friction lining and a process for producing a friction lining, in particular for dutch disks, brakes or the like.

2. Description of Prior Art

Such clutch linings are used, in particular, for friction clutches in motor vehicles in which they are riveted onto a metallic support plate or clutch disk in order to allow, in combination with a counter-element in the clutch-engaged state, transmission of force between an engine and a gearbox or to disengage in the case of an open clutch.

The clutch linings here have to meet demanding requirements because they need to meet a plurality of requirements which cannot readily be achieved in the same way. In particular, the clutch lining should have a high burst rotational speed in order not to be destroyed by centrifugal forces, have a high coefficient of friction by means of which a large torque can be transmitted, also display low wear and be resistant to shape-changing distortion as a result of heat and/or forces. The clutch linings should nevertheless be very uncomplicated and thus be economically producible.

According to the prior art, a winding is first produced in order to produce a clutch lining. Such a winding can, for example, be wound from an impregnated yarn. Here, a yarn optimized in terms of coefficient of friction and wear is drawn through an impregnation solution and brought to a constant weight ratio of yarn to impregnation solution. The yarn is subsequently dried. For example, a carded yarn comprising aramid fibers, staple glass fibers, viscose fibers or PAN fibers, and also brass wire can be used. Another example is a mixed filament yarn comprising glass filament and metal wires. The various yarns can also be used in combination. The impregnation solution used is a dispersion comprising polymeric components, fillers and solvents. The polymeric components can comprise thermosetting components such as phenolic resin or melamine resin and also elastomeric components such as SBR or NBR rubber. Fillers are, for example, barium sulfate, kaolin or carbon black. The solvent used is usually water. The dried yarn is subsequently wound to form a winding.

Novolak resins are predominantly used as binders for producing known frictional linings according to the prior art. Apart from the novolak-based binders, phenolic and cresol resols are also used. In the case of compositions which are produced moist, solvent-containing and aqueous resols are predominant. An important parameter in the case of these liquid binders is that they have a high impregnation capability, uniform drying and setting rates and good compatibility with any rubber modifiers used. A disadvantage of the known binders based on synthetic resin is that they do not have a satisfactory heat stability.

According to the prior art, organically bound friction linings are used for dry-running clutches. The term "organically bound" is derived from chemical nomenclature and indicates that phenolic resins, melamine resins, polyester resins and/or various types of rubber are used as binders. As phenolic resin, use is usually made of a resol, viz. a self-cross-linking phenolic resin based on water as solvent. As an alternative, solvent-containing novolak resin systems are used. These binders are provided with a friction-active, usually powdery filler system and applied as a dispersion to a yarn comprising organic and/or inorganic fibers in an impregnation process with subsequent drying. This impregnated yarn treated with "friction cement" is wound into a defined shape and pressed in the subsequent process steps. Finally, final machining is carried out.

Resol systems in particular frequently react extremely unflexibly to raw material modifications, in particular modifications of the rubber system (latex compatibility). Continuous matching of the formulations to changing market conditions can thus be achieved only with difficulty.

A further disadvantage of the resol system is the high water or solvent content of the resol or novolak and also of the added latex. The water or the solvent has to be removed again by means of a system which consumes a great deal of energy or heat. During this heating, in particular in the case of resol, there is a risk that the self-crosslinking phenolic resin reacts in an undefined manner and thus alter the materials properties. The reaction products formed on cross-linking have to be disposed of because of their toxicity, usually by means of thermal after-combustion, in a costly manner.

SUMMARY OF THE INVENTION

It is an object of the invention to develop an alternative, water-free and effective binder system based on phenolic resin.

According to the process, the friction lining is produced from at least one winding which is wound from at least one yarn impregnated with an impregnation dispersion. The impregnation dispersion comprises at least resin, a hardener, a rubber system, fillers and a vulcanization system. According to the invention, a low-melting, water-free and solvent-free novolak resin is used as resin and a high-viscosity to medium-viscosity rubber system is employed.

The novolak resin has a melting point in the range from less than 50 to 100 degrees Celsius, preferably 70 degrees Celsius.

The rubber system has a viscosity above 5000 mPas (Brookfield viscosity) and can be homogenized with the other constituents of the impregnation dispersion.

The hardener becomes reactive only above an initiation temperature and then serves to cross-link the resin. The hardener is selected so that the initiation temperature is above the melting point of the novolak.

Hexamethylenetetramine, which has an initiation temperature of about 110 degrees, is used as hardener.

The novolak resin is liquefied by heating and at least the rubber system, the fillers and the vulcanization system are mixed in. In a further step, the hardener is added.

As an alternative, all constituents of the impregnation solution are mixed into the heated, liquefied novolak resin.

The novolak which has been liquefied by heating has a temperature in the range from 50 to 100 degrees Celsius, preferably 70 degrees Celsius. This preferred temperature is at or above the melting point of the novolak but below the initiation temperature of the hardener.

The impregnation of the yarn with the impregnation dispersion is carried out by means of an impregnation bath.

As an alternative, the impregnation of the yarn with the impregnation dispersion can be carried out by means of a pultrusion process.

Only in a further processing step is the temperature above the initiation temperature of the hardener, so that cross-linking of the resin occurs in this step.

The impregnation dispersion comprises at least

| | |
|---|---|
| 15-55% | of novolak resin |
| 1-5% | of hexamethylenetetramine |
| 7-35% | of rubber |
| 0-8% | of kaolin |
| 7-25% | of barite |
| 0-15% | of tricalcium phosphate |
| 0-25% | of carbon black |
| 0-8% | of tin sulfide |
| 0-8% | of pyrolysis carbon |
| 0-8% | of graphite |
| 0.1-5% | of sulfur |
| 0.1-5% | of vulcanization accelerator, | where the percentages are percentages by weight based on the impregnation dispersion and the rubber can be SBR or NBR rubber.

This process can be used to produce a friction lining, in particular a friction lining for clutches, which comprises at least one yarn impregnated with an impregnation dispersion. The impregnation dispersion comprises at least resin, a hardener, a rubber system, fillers and a vulcanization system. The resin is a low-melting, water-free and solvent-free novolak and the rubber system is high to medium to large.

BRIEF DESCRIPTIONS OF THE DRAWINGS

Further advantages and advantageous embodiments of the invention are subject matter of the following figure and the description thereof. In detail:

FIG. 1 schematically shows the process of the invention

DETAILED DESCRIPTION OF THE PREFERRED EMBODIMENTS

The idea on which the invention is based is to replace a self-crosslinking resol system by a low-melting water- and solvent-free novolak resin. Novolak is a solid phenolic resin which is frequently produced by acid catalysis and has a low melting point below 70 degrees Celsius and, without an additional hardener or cross-linker, has no self-cross-linking properties. Furthermore, a high-viscosity to medium-viscosity NBR or SBR rubber, which can be homogenized with the other constituents of the impregnation dispersion, is used as replacement for an aqueous latex system or powdery rubber system used in conjunction with the resol system. Four formulations for producing the impregnation dispersion are given below. The constituents of the impregnation dispersion are given in percent by weight.

| | Formulation 1 | Formulation 2 | Formulation 3 | Formulation 4 |
|---|---|---|---|---|
| Novolak | 52 | 35 | 24 | 31 |
| Hexamethylenetetramine | 3 | 3 | 2 | 2 |
| NBR rubber | 10 | 26 | 33 | 26 |
| Kaolin | 3 | 2 | 5 | 2 |
| Barite | 10 | 10 | 16 | 18 |
| Tricalcium phosphate | 10 | 7 | 7 | 0 |
| Carbon black | 0 | 9 | 0 | 15 |
| Tin sulfide | 5 | 2 | 5 | 0 |
| Pyrolysis carbon | 0 | 0 | 2 | 0 |
| Graphite | 5 | 0 | 0 | 0 |
| Sulfur | 1 | 3 | 3 | 3 |
| Vulcanization accelerator | 1 | 3 | 3 | 3 |

To be able to impregnate the yarn, all components of the respective formulation are mixed into the novolak resin which has been heated to about 50 to 100 degrees Celsius and thus liquefied in the mixing step 10. In addition, a hardener, for example hexamethylenetetramine, which becomes reactive only above a particular initiation temperature and cross-links the phenolic resin is added. In the case of hexamethylenetetramine, this initiation temperature is above 100 degrees Celsius.

The impregnation of the yarn subsequently occurs in the impregnation step 20, either by means of a conventional impregnation process or by a pultrusion process. In the case of a conventional impregnation process, the yarn is passed through an impregnation bath, with heated feed lines which are generally heated to not over 100 degrees Celsius usually being used. In the case of the pultrusion process, the viscous, heated impregnation dispersion is applied to the yarn by means of a pressure impregnation head. For this purpose, the yarn is passed through an appropriate nozzle by means of which a precisely defined amount of solution is applied to the yarn. Drying of the yarn is achieved by means of a short cooling stretch at room temperature. Due to the melting point of the novolak resin, the dispersion applied in viscous form hardens within a few seconds to such an extent that the impregnated yarn can be processed further without sticking.

No or only a minimal cross-linking reaction of the novolak resin takes place during this impregnation step since the initiation temperature of the hardener or cross-linker is not reached in the preceding process steps. Cross-linking occurs only in the further processing step 30, for example during pressing, which is carried out at temperatures above 110 degrees Celsius. The non-adhesive yarn is usually wound up beforehand to form a coil, later processed in a winding process to form a winding and then pressed.

The invention claimed is:

1. A process for producing a friction lining for clutches, produced from at least one winding, where the winding is wound from at least one yarn impregnated with an impregnation dispersion comprising at least resin, a hardener, a rubber system, fillers and a vulcanization system,
    wherein the resin is a low-melting, water-free and solvent-free novolak resin and the rubber system has a high to medium viscosity of greater than 5000 mPas and can be homogenized with other constituents of the impregnation dispersion, and
    wherein the impregnation dispersion consists of formulation 1 or formultion 2, where
    formulation 1 consists of 52% novoiak, 3% hexamethylenetetramina 10% NBR rubber, 3% kaolin, 10% barite, 10% tricalcium phosphate, 5% graphite, 1% sulfur, and 1% vulcanization accelerator, and
    formulation 2 consists of 35% novolak, 3% hexamethylenetetramrine, 26% NBR rubber, 2% kaolin, 10% barite, 7% tricalcium phosphate, 9% carbon black, 2% tin sulfide, 3% sulfur, and 3% vulcanization accelerator,
    where percentages are percentages by weight based in the impregretion dispersion.

2. The process of claim 1, wherein the novoiak resin has a melting point ranging from less than 50° C. to 100° C., 3. The process of claim 2, wherein the melting point of the heated, liquefied novolak resin is 70° C.

4. The process of claim 1, wherein the hardener becomes reactive only above an initiation temperature and than crosslinks the resin, the novolek resin has a melting point, and the hardener is selected so that an initiation temperature is above the melting point of the novolak resin.

5. The process of claim 4, wherein the hardener is hexamethylenetetramine and has an initiation temperature at or above 110° C.

6. The process of claim 1, wherein at least the rubber system, the fillers and the vulcanization system are mixed into a heated, liquefied novolak resin.

7. The process of claim 6, wherein the hardener is added in a subsequent further step of the process.

8. The process of claim 6, wherein the novolak resin has a melting point, the heated, liquefied novolak resin has a temperature ranging from 50° C. to 100° C., which is at or above the melting point of the novolak resin, but below an initiation temperature of the hardener.

9. The process of claim 8, wherein the temperature of the heated, liquefied novolak resin is 70° C.

10. The process of claim 1, wherein all constituents of the impregnation dispersion are mixed into a heated, liquefied novolak resin.

11. The process of claim 1, wherein the impregnation of the yarn with the impregnation dispersion is carried out by means of an impregnation bath.

12. The process of claim 1, wherein the impregnation of the yarn with the impregnation dispersion is carried out by means of a pultrusion process.

13. The process of claim 1, further comprising a step of bringing the temperature above an initiation temperature of the hardener, and allowing cross-linking of the novolak resin to occur.

14. A friction lining for clutches, comprising:
   at least one yarn impregnated with an impregnation dispersion having at least resin, a hardener, a rubber system, fillers and a vulcanization system,
   wherein the resin is a low-melting, water-free and solvent-free novolak resin and the rubber system is of high to medium viscosity of greater than 5000 mPas and can be homogenized with other constituents of the impregnation dispersion, and
   wherein the impregnation dispersion consists of formulation 1 or for 2 where
   formulation 1 consists of 52% novolak, 3% hexamethylenetetramine, 10% NBR rubber, 3% kaolin, 10% barite tricalcium phosphate, 5% graphite,
   formulation 2 consists of 35% novolkak, 3% hexamethylenetetramine, 26% rubber, 2% kaolin, 10% barite, 7% tricalcium phosphate, 9% carbon black, 2% tin sulfide, 3% sulfur, and 3% vulcanization accelerator,
   where percentages are percentages by weight based on the impregnation dispersion.

* * * * *